(12) United States Patent
Kim

(10) Patent No.: US 6,414,921 B1
(45) Date of Patent: Jul. 2, 2002

(54) SERVO CONTROL APPARATUS AND METHOD FOR COMPENSATING FOR AXIAL VIBRATION OF AN OPTICAL DISK

(75) Inventor: Jin Seon Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/457,663

(22) Filed: Dec. 9, 1999

(30) Foreign Application Priority Data

Dec. 11, 1998 (KR) .............................. 98-54952

(51) Int. Cl.[7] .............................. G11B 7/00; G11B 5/09
(52) U.S. Cl. .................................. 369/47.44; 369/53.14
(58) Field of Search .......................... 369/44.32, 44.29, 369/47.44, 53.3, 53.28, 53.13, 53.14, 53.18

(56) References Cited

U.S. PATENT DOCUMENTS 6,097,680 A * 8/2000 Yen et al. ................. 369/44.32
6,195,321 B1 * 2/2001 Takamine et al. ......... 369/47.44
6,195,322 B1 * 2/2001 Ohtani et al. ............. 369/53.14
6,259,661 B1 * 7/2001 Suekuni .................... 369/47.44

* cited by examiner

Primary Examiner—Thang V. Tran
(74) Attorney, Agent, or Firm—Birch, Stewart, Kolasch & Birch, LLP

(57) ABSTRACT

A servo control apparatus and method that adjust the allowable maximum rotation speed of an optical disk based upon the amount of disk axial vibration. The servo control apparatus in accordance with the present invention includes a driver for rotating the optical disk, a detector for detecting the amount of axial vibration of the optical disk, and a controller for controlling the rotation speed of the optical disk based upon the detected amount of disk axial vibration. The servo control apparatus and method in accordance with the present invention prevents data read error due to disk axial vibration by adjusting the allowable maximum disk rotation speed in consideration for the amount of disk axial vibration caused by imperfect disk manufacturing process, disk clamping error, or disk tilt.

19 Claims, 5 Drawing Sheets

SERVO CONTROL APPARATUS AND METHOD FOR COMPENSATING FOR AXIAL VIBRATION OF AN OPTICAL DISK

BACKGROUND OF THE INVENTION

1. Field of the Invention

The present invention relates to an apparatus and method for servo control of an optical disk drive, and more particularly, but not by way of limitation, to servo control apparatus and method that adjusts the rotation speed of an optical disk in consideration of the amount of axial vibration of the optical disk.

2. Description of the Related Art

Shown in FIG. 1 is a general optical disk reproducing apparatus, comprising an optical pickup 2 for reproducing recorded signals from an optical disk 1, an R/F unit 3 for equalizing and shaping the RF signals reproduced by the optical pickup 2, a sync clock generator 7 for creating a clock signal synchronized with the binary data outputted from the R/F unit 3, a digital signal processing unit 4 for processing the binary data stream received from the R/F unit 3 to retrieve digital data using the synchronization clock, an interface unit 5 for connecting the retrieved digital data to a PC, a sled motor 11 for moving the optical pickup 2, a spindle motor 12 for rotating the optical disk 1, a driver 8 for driving the sled motor 11 and the spindle motor 12, a servo unit 6 for controlling the optical pickup 2 and the driver 8, a microcomputer 9 for supervising overall operation of the servo unit 6 and the digital signal processing unit 4, and a memory 10 for storing data necessary for the microcomputer 9.

The servo control operation of the general optical disk reproducing apparatus is as follows.

Once the optical disk 1 is inserted into a disk tray, which is a part of the optical disk reproducing apparatus mechanism, the optical disk 1 is clamped by a clamping device. Then, controlled by the servo unit 6, the driver 8 provides the spindle motor 11 with electric current, thereby rotating the optical disk 1.

To reproduce signals recorded on the optical disk 1, the optical pickup 2 with a laser diode and photo diodes installed in it, forms a laser beam spot on the recording layer of the optical disk 1 by irradiating a laser beam from the laser diode. The laser beam reflected from the optical disk 1 is collected by the photo diodes and converted into electric signals. The R/F unit 3 equalizes and shapes the electric signals to produce binary data and the digital signal processing unit 4 performs the processing of the binary data to retrieve original data. The synchronization clock needed for the digital signal processing unit 4, synchronized with the binary data from R/F unit 3, is provided by the sync clock generator 7.

Using the synchronization clock, the digital signal processing unit 4 retrieves original digital data from the binary data outputted by the R/F unit 3.

The basic role of the sled motor 11 is to move the optical pickup 2 in the radial direction. Controlled by the servo unit 6, the sled motor 11 moves the optical pickup 2 rapidly in the radial direction in the track search mode for locating a desired track. Also controlled by the servo unit 6, the spindle motor 12 rotates the optical disk 1 with a required rotation speed.

After the optical disk 1 is inserted into the disk tray and clamped by the clamping device, the microcomputer 9 controls the servo unit 6 so that the driver 8 increases the input voltage to the spindle motor 11. As the rotation speed of the optical disk 1 increases, the data transfer rate of the optical disk reproducing apparatus also becomes higher.

For read-out of recorded data with a high rotation speed, high-accuracy tracking and focusing control is required. In the instance where the axial vibration of the optical disk caused by imperfect disk manufacturing process, disk clamping error, or disk tilt exceeds a certain limit, tracking and focusing control may yield large errors and thus normal data read-out becomes impossible, which is a major obstacle to high-speed rotation optical disk reproducing apparatus.

SUMMARY OF THE INVENTION

It is an object of the present invention to provide a servo control apparatus and method that provides stable data read-out capability by adjusting the allowable maximum disk rotation speed by measuring the amount of axial vibration of a rotating optical disk.

The servo control apparatus in accordance with the present invention comprises driver means for rotating the optical disk, detection means for detecting the amount of axial vibration of the rotating optical disk, and control means for controlling the rotation speed of the optical disk based upon the detected amount of disk axial vibration.

According to the servo control apparatus and method of the present invention, if an optical disk is inserted into a disk tray, the amount of disk axial vibration is measured from a center error signal by rotating the optical disk at a low speed with only focusing control activated. The allowable maximum rotation speed of the optical disk is limited based on the measured amount of disk axial vibration.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 1:
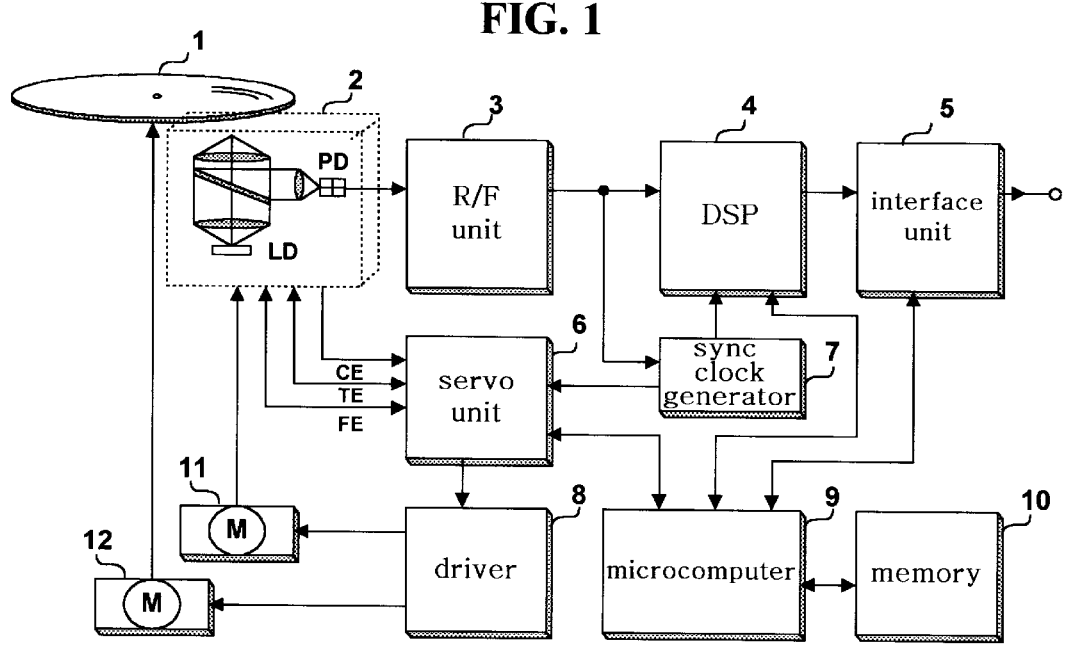
FIG. 1 is a block diagram of a general optical disk reproducing apparatus.
Figure 2:
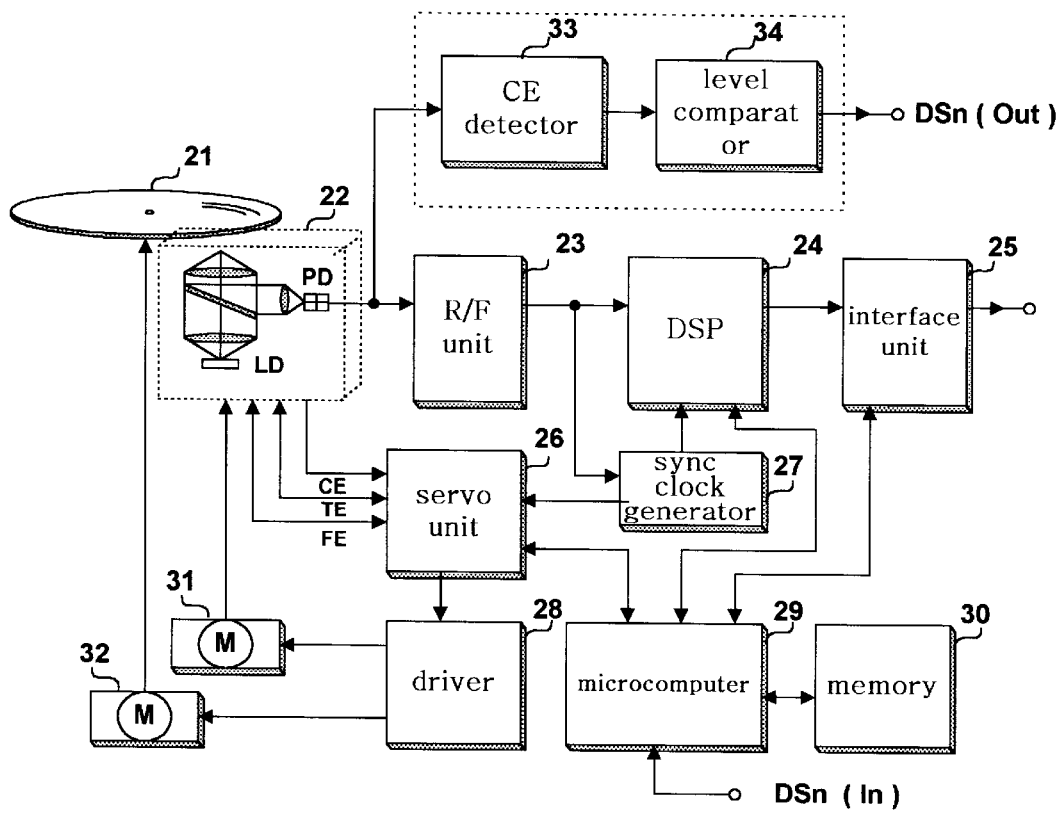
FIG. 2 is a block diagram of an optical disk reproducing apparatus embodying the present invention.

FIG. 2 depicts an optical disk reproducing apparatus in which the present invention may be advantageously practiced. The apparatus comprises an optical pickup 22 for reproducing recorded signals from an optical disk 21, an R/F unit 23 for equalizing and shaping the RF signals reproduced by the optical pickup 22, a sync clock generator 27 for creating a clock signal synchronized with the binary data outputted from the R/F unit 23, a digital signal processing unit 24 for processing the binary data stream received from the R/F unit 3 to retrieve digital data using the synchronization clock, an interface unit 25 for connecting the retrieved digital data to a PC, a sled motor 31 for moving the optical pickup 22, a spindle motor 32 for rotating the optical disk 21, a driver 28 for driving the sled motor 31 and the spindle motor 32, a servo unit 26 for controlling the optical pickup 22 and the driver 28, a microcomputer 29 for supervising overall operation of the servo unit 26 and the digital signal processing unit 24, a memory 30 for storing data necessary for the microcomputer 29, a center error detector 33 for detecting a center error signal from the output of the photo diodes installed in the optical pickup 22, and a comparator 34 for comparing the center error signal with reference levels.

Figure 3:
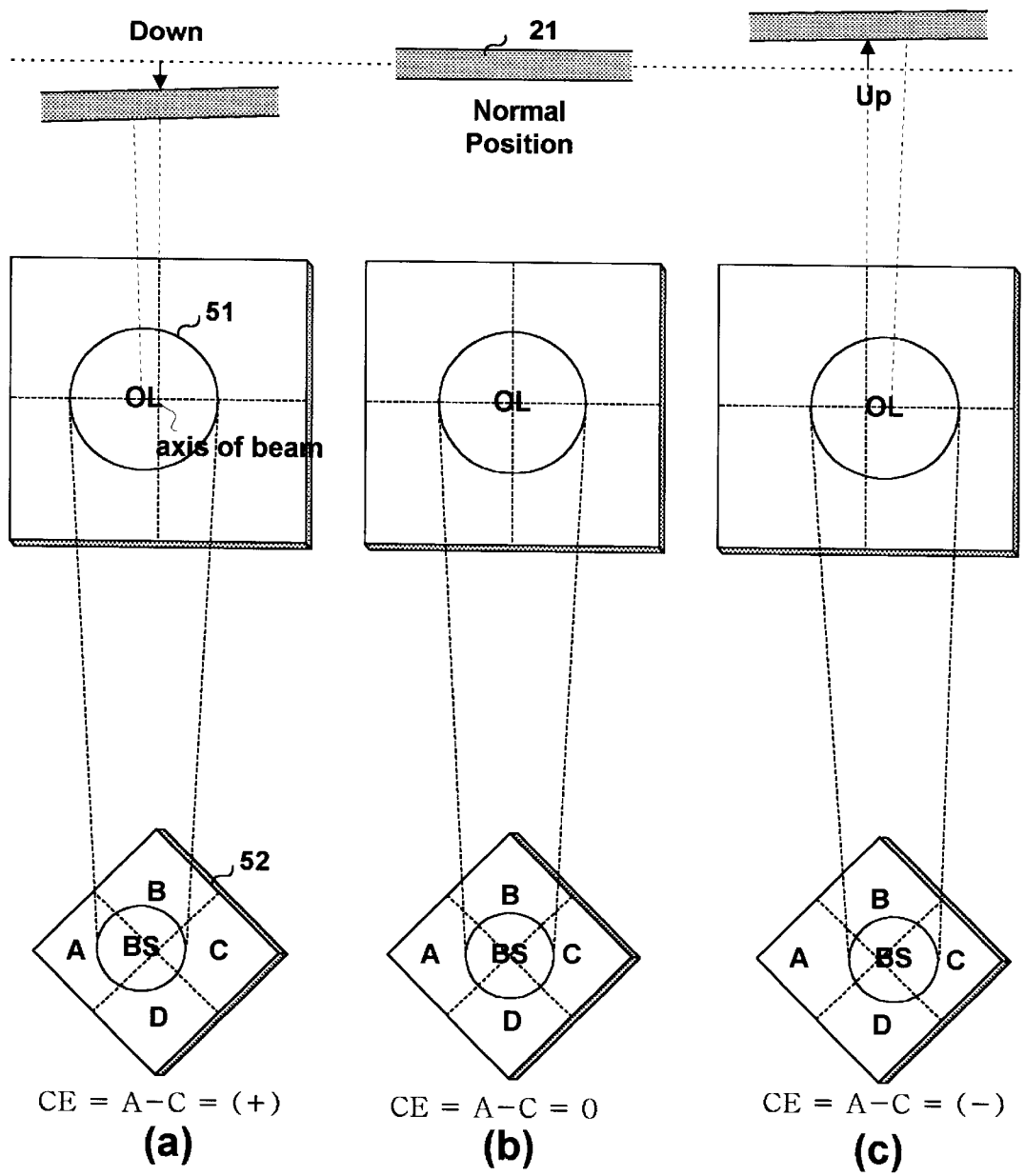
FIG. 3 is a pictorial representation showing the principle for measuring the amount of disk axial vibration in accordance with the present invention.

FIG. 3 shows the principle for measuring the amount of the axial vibration of the optical disk 21 in accordance with the present invention. Photo diodes 52 collects the laser beam reflected from the optical disk 21 and passed through an objective lens 51. The center error corresponding to the axial vibration of the optical disk 21 can be detected from the laser beam collected by the photo diodes 52. The objective lens 51 is designed to move in the axial direction and radial direction simultaneously for focusing and tracking control, respectively.

Figure 4:
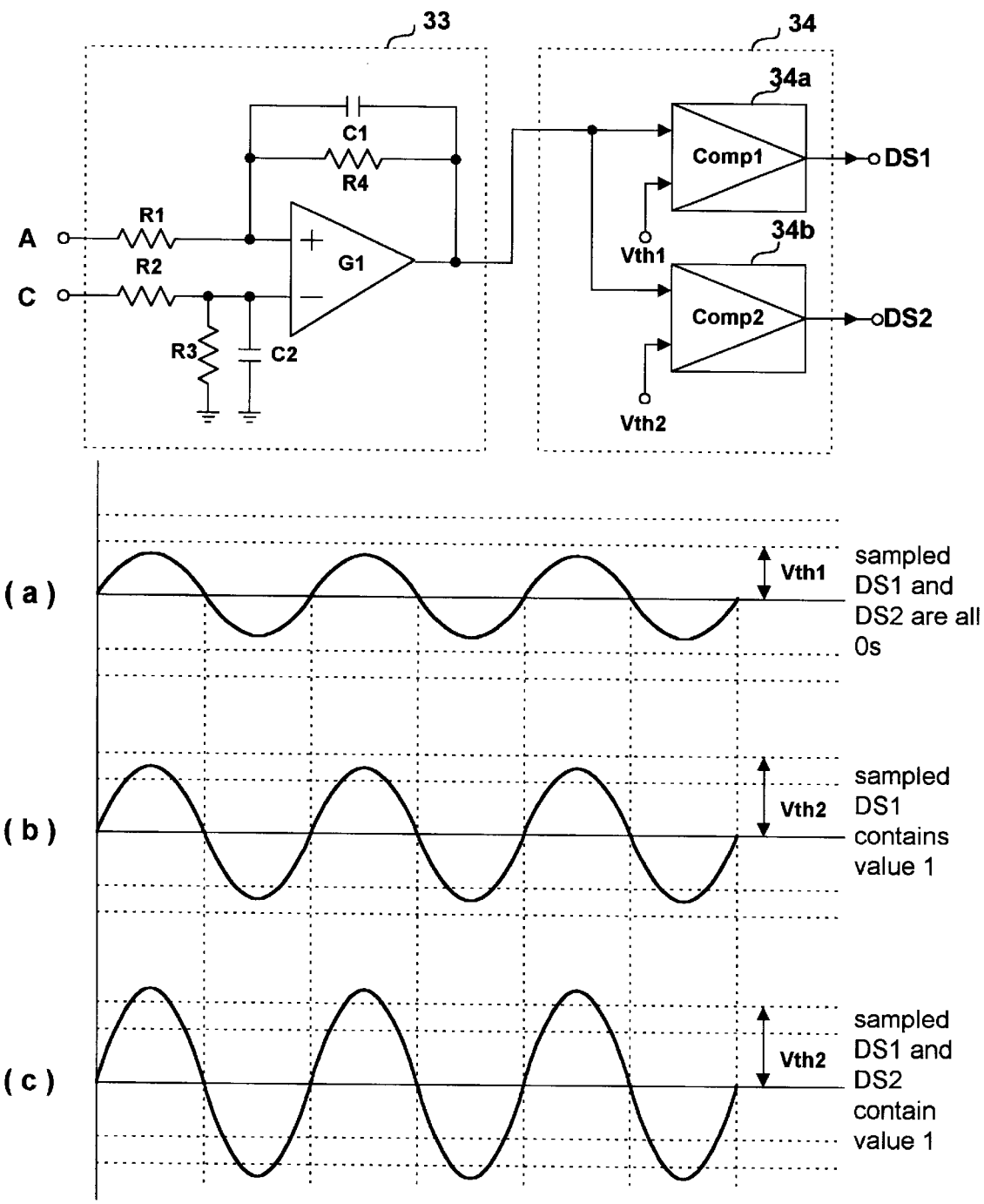
FIG. 4 is a pictorial representation showing a center error detector, a comparator, and their output signals.

FIG. 4 shows the center error detector 33, the comparator 34, and their output signals. The center error detector 33 comprises a differential amplifier G1 and a plurality of passive elements (R1~R4, C1, C2). The input ports of the differential amplifier G1 connects to A and C of the photo diodes. The comparator 34 comprises two comparators 34a and 34b having distinct reference levels Vth1 and Vth2. The center error signal is compared with each of the reference levels Vth1 and Vth2 and is then converted into bi-level signals of DS1 and DS2 which is applied to the microcomputer 29.

Owing to disk manufacturing defects, clamping error, or disk tilt, the recording layer of the optical disk 21 inserted into the disk tray is not flat nor perpendicular to the optical axis. Axial vibration of the optical disk 21, therefore, is unavoidable.

To measure the amount of disk axial vibration, only focusing control is activated and the center error (CE=A−C) is detected from the photo diodes 52 while rotating the optical disk 21 at a constant speed.

As focusing control is activated, the objective lens 51 moves upward or downward to maintain the distance between the object lens 51 and the surface of the optical disk 21 constant. If the optical disk 21 is not flat or tilts, the recording layer of the optical disk 21 is not perpendicular to the optical axis. The center of the laser beam reflected from the optical disk 21, therefore, moves slightly in the radial direction depending upon the magnitude of disk axial vibration, which yields the center error signal corresponding to the amount of disk axial vibration.

When measuring the center error signal, tracking control should be inactivated to obtain the center error signal only resulting from the disk axial vibration by eliminating the effects of radial vibration of the optical disk 21.

In the instance where the recording layer of the rotating optical disk 21 goes down the horizontal plane due to disk axial vibration, the photo diode A collects more light than C and thus the center error has a positive sign as shown in case (a) of FIG. 3. If the recording layer of the optical disk 21 is parallel to the horizontal plane, the reflected beam exactly falls on the center of the photo diodes, which leads to zero center error as shown in case (b) of FIG. 3. In the instance where the recording layer of the optical disk 21 goes up the horizontal plane due to disk axial vibration, the photo diode C collects more light than A and thus the center error has a negative sign as shown in case (b) of FIG. 3.

As shown in FIG. 4, the center error signal detected by the center error detector 33 is a sinusoidal wave, the amplitude of which is proportional to the amount of disk axial vibration. The magnitude of the center error signal is compared with the threshold levels Vth1 and Vth2 of the comparators 34a and 34b. The microcomputer 29 keeps sampling the bi-level output of each comparator 34a or 34b to check whether there is value 1 in the sampled values, and estimates or measures the amount of disk axial vibration based on the existence of sampled value 1.

Depending upon the estimated amount of disk axial vibration, the microcomputer 29 adjusts the maximum rotation speed of the spindle motor 32, thereby preventing data read error due to disk axial vibration and allowing stable data read-back capability.

Figure 5A:
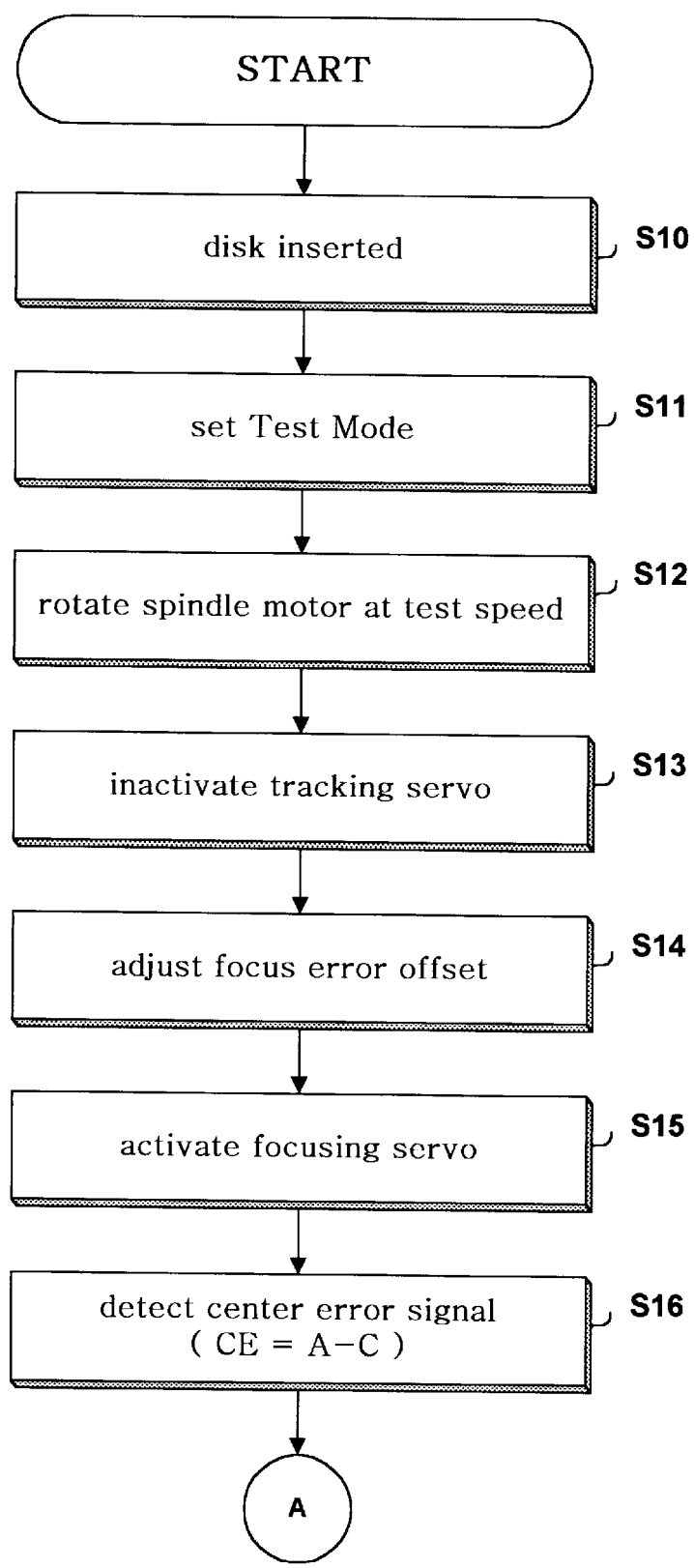
FIGS. 5A and 5B are flow diagrams of the servo control method in accordance with the present invention.
Figure 5B:
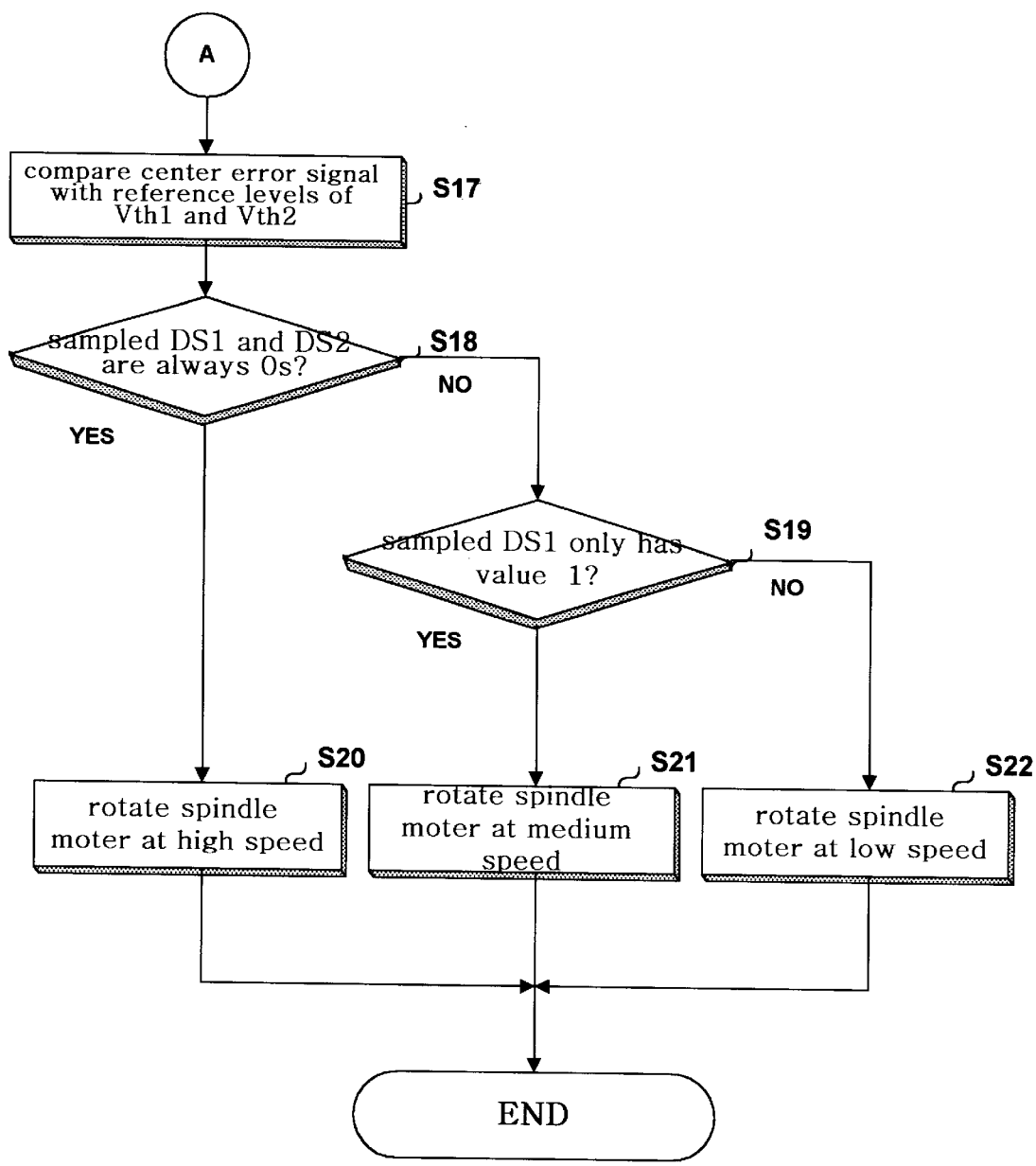

The servo control method for compensating for axial vibration of an optical disk in accordance with an embodiment of the present invention will now be explained with reference to FIGS. 5A and 5B.

If the optical disk 21 is inserted into a disk tray (S10), the microcomputer 29 sets a test mode for estimating the amount of disk axial vibration (S11) and issues a command to the servo unit 26 for rotating the optical disk 21. Receiving the command, the servo unit 26 controls the driver 28 so that the optical disk 21 rotates with a preset speed appropriate for the test mode (S12).

After inactivating the tracking servo system (S13), the microcomputer 29 performs a step for adjusting the focus error offset (S14) to eliminate initial offset in a focus error signal and begins focusing control (S15).

The center error detector 33 generates the center error signal by amplifying and low-pass filtering the difference between the outputs of photo diodes A and C (S16). The comparators 34a and 34b of the comparator 34 compares the magnitude of the center error signal with their threshold levels Vth1 and Vth2 (Vth1<Vth2) (S17). If the magnitude of the center error signal is less than the first threshold level Vth1, both outputs DS1 and DS2 remain low. In the case where the magnitude of the center error signal is greater than the first threshold level Vth1 but less than the second threshold level Vth2, the output DS2 remains low but DS1 has logic-high state. In the other case, both of DS1 and DS2 have logic-high state.

By sampling the outputs DS1 and DS2 during a predetermined time interval, the microcomputer 29 estimates the amount of disk axial vibration. If both of DS1 and DS2 always remain low (S18), the microcomputer 29 concludes that the axial vibration is acceptable and sets the normal disk rotation speed to an allowable maximum value (S20). If DS2 remains low and DS1 has logic-high state during the time interval (S19), the microcomputer 29 sets the normal disk rotation speed to a preset medium value (S21).

In the other case, the microcomputer 29 concludes that the disk axial vibration is very large and sets the normal disk rotation speed to a preset minimum value (S22). In this case, the optical disk 21 rotates with the minimum rotation speed, though a disk rotation speed higher than the minimum rotation speed is requested.

In the aforementioned embodiment, the three different values of allowable disk rotation speed were determined based upon the amount of disk axial vibration. It is also possible to increase the number of preset disk rotation speeds by increasing the number of comparators. In addition, the microcomputer 29 can estimate the amount of disk axial vibration by directly sampling the center error signal instead of using comparators.

The servo control apparatus and method in accordance with the present invention prevents data read error due to disk axial vibration by adjusting the allowable maximum disk rotation speed in consideration for the amount of disk axial vibration caused by imperfect disk manufacturing process, disk clamping error, or disk tilt.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A servo control apparatus for compensating for axial vibration of an optical disk, comprising:
    a driving unit rotating the optical disk;
    a detection unit detecting the amount of axial vibration of the rotating optical disk, the detection unit including a center error detector detecting the center error signal indicating a deviation from an axial center with respect to an objective lens;
    a comparator comparing the detected center error signal with a predetermined value and outputting a signal; and
    a control unit controlling the rotation speed of the optical disk based upon the output signal from the comparator.

2. The apparatus set forth in claim 1, wherein said comparator compares the center error signal with at least two predetermined values, and determines which range the detected center error signal falls into.

3. The apparatus as set forth in claim 1, wherein said center error detector detects the center error signal with focusing control activated and tracking control inactivated.

4. The apparatus set forth in claim 2, wherein said control unit controls the allowable maximum rotation speed of the optical disk based upon the range into which the center error signal falls.

5. The apparatus set forth in claim 1, wherein said control unit lowers the allowable maximum rotation speed of the optical disk based upon the detected amount of disk axial vibration.

6. The apparatus set forth in claim 1, wherein said driving unit rotates the optical disk with a rotation speed lower than a normal playback speed for detecting the amount of disk axial vibration.

7. A servo control apparatus for compensating for axial vibration of an optical disk, comprising:
    a driving unit rotating the optical disk;
    a servo unit controlling a focusing and tracking operation with respect to an optical pickup; and
    a controller measuring an amount of disk axial vibration by detecting a center error signal generated from the optical pickup with the tracking operation inactivated by said servo unit, the center error signal indicating a deviation from axial center with respect to an objective lens, and controlling the rotation speed of the optical disk based upon the measured amount disk axial vibration.

8. A servo control method for compensating for axial vibration of an optical disk, comprising the steps of:
    (a) rotating the optical disk by driving a spindle motor;
    (b) measuring the amount of the axial vibration of the rotating optical disk, the amount of axial vibration based upon an amplitude of a center error signal indicative of deviation from axial center with respect to an objective lens; and
    (c) limiting the rotation speed of the optical disk based upon the measured amount of disk axial vibration.

9. The servo control method set forth in claim 8, wherein said step (b) detects the amount of axial vibration of the optical disk with tracking control inactivated.

10. The method set forth in claim 8, wherein said step (a) rotates the optical disk with a rotation speed lower than a normal playback speed.

11. The method set forth in claim 8, wherein said step (c) lowers the allowable maximum rotation speed of the spindle motor based upon the detected amount of disk axial vibration.

12. The method set forth in claim 11, further comprising a step for rotating the optical disk with the set allowable maximum rotation speed in the instance where a disk rotation speed higher than the allowable maximum rotation speed is requested.

13. The method set forth in claim 8, wherein said step (b) further comprises a step of determining a range which corresponds to the level as compared with at least two predetermined levels.

14. An apparatus for controlling a rotation speed in an optical disk player, comprising:
    a pickup reading a data recorded on a disk;
    a servo controlling a tracking and focusing operation with respect to the optical disk;
    an error detector detecting an error signal indicative of an axial deviation of the disk based on a signal read in the pickup;
    a comparator comparing the error signal with at least two predetermined values, and outputting a signal in response to the comparing result; and
    a controller determining a range in which the error signal is included, in response to the output signal, and controlling the rotation speed of the disk based on the determined range.

15. The apparatus set forth in claim 14, wherein the controller controls the rotation speed in low, normal and high speed based on the determined range.

16. The apparatus set forth in claim 14, wherein the controller determines the range based on values obtained after sampling the output signal of the comparator at a predetermined period.

17. An apparatus for controlling a rotation speed in an optical disk player, comprising:
    a pickup reading a data recorded on a disk;
    a servo controlling a tracking and focusing operation with respect to the optical disk;
    an error detector detecting an error signal indicative of an axial deviation of the disk based on a signal read in the pickup; and
    a controller sampling the detected error signal, determining a peak value obtained from the sampled error signal, calculating the axial vibration from the peak value of the error signal, and controlling the rotation speed based on the calculated axial vibration.

18. The apparatus set forth in claim 17, wherein the error detector detects the error signal in a status of tracking-off.

19. The apparatus set forth in claim 17, wherein the controller calculates the axial vibration from the peak value of the error signal as compared to at least two predetermined values.

* * * * *